(12) United States Patent
Ikawa

(10) Patent No.: US 11,246,285 B2
(45) Date of Patent: Feb. 15, 2022

(54) PAPER BEDDING AND PAPER BEDDING PRODUCT

(71) Applicant: JOYU PULP CO.,LTD., Shikokuchuo (JP)

(72) Inventor: Tatsuya Ikawa, Shikokuchuo (JP)

(73) Assignee: JOYU PULP Co., Ltd., Shikokuchuo (JP)

( * ) Notice: Subject to any disclaimer, the term of this patent is extended or adjusted under 35 U.S.C. 154(b) by 418 days.

(21) Appl. No.: 16/304,980

(22) PCT Filed: May 15, 2017

(86) PCT No.: PCT/JP2017/018133
§ 371 (c)(1),
(2) Date: Nov. 27, 2018

(87) PCT Pub. No.: WO2018/211547
PCT Pub. Date: Nov. 22, 2018

(65) Prior Publication Data
US 2019/0373846 A1    Dec. 12, 2019

(51) Int. Cl.
*A01K 1/015* (2006.01)

(52) U.S. Cl.
CPC .................. *A01K 1/0155* (2013.01)

(58) Field of Classification Search
CPC ..... A01K 1/0155; A01K 1/015; A01K 1/0152
See application file for complete search history.

(56) References Cited

U.S. PATENT DOCUMENTS

| | | | | |
|---|---|---|---|---|
| 4,378,756 A | * | 4/1983 | Whiteman | B02C 13/284 119/172 |
| 5,044,324 A | * | 9/1991 | Morgan | A01K 1/0155 119/171 |

(Continued)

OTHER PUBLICATIONS

Gex Co., Ltd.; http://product-fish.gex-fp.co.jp/product_animal/?m=ProductListDetail&cid=205&id=1154, retrieved on Nov. 27, 2018, which is a corresponding page to NPL1 disclosed on the p. 2 of the specification, Gex Co., Ltd.; search performed Apr. 10, 2017; Internet <https://www.gex-fp.co.jp/animal/catalog/haming/kaitekimat.html> (No English translation is submitted but concise explanation of the relevance be found in the specification).

(Continued)

*Primary Examiner* — Trinh T Nguyen
(74) *Attorney, Agent, or Firm* — Muncy, Geissler, Olds & Lowe, P.C.

(57) ABSTRACT

Provided is a bedding and a bedding product that in addition to having good hygroscopicity and cushioning characteristics are suited to the hole-digging behavior of animal pets and that can be manufactured at low cost without the need to carry out molding into special shapes. It comprises a plurality of fragments 11 of deciduous hardwood pulp sheeting; both faces of fragments 11 have convexities and concavities produced by indentation and cracking; sectional faces of fragments 11 are covered by pulp fibers that protrude from the fragment interior; density of bedding 1 is 0.03 g/cm³ to 0.06 g/cm³; and the constitution is such that fragments 11 within bedding 1 display a particular size distribution.

2 Claims, 9 Drawing Sheets

(56) References Cited

U.S. PATENT DOCUMENTS

| | | | | |
|---|---|---|---|---|
| 2010/0006035 | A1* | 1/2010 | Spittle | A01K 1/0152 119/172 |
| 2012/0285384 | A1* | 11/2012 | Boote | A01K 1/0152 119/28.5 |
| 2013/0126781 | A1* | 5/2013 | Boote | A01K 1/0152 252/184 |
| 2013/0319341 | A1* | 12/2013 | Zhang | A01K 1/0154 119/173 |
| 2017/0081251 | A1* | 3/2017 | Townsend | C05F 17/00 |

OTHER PUBLICATIONS

Petline Co., Ltd.; http://www.petline.co.jp/sanitary/01/, retrieved on Nov. 27, 2018, which is a corresponding page to NPL2 disclosed on the p. 2 of the specification, Petline Co., Ltd.; search performed Apr. 10, 2017; Internet <http://www.petline.co.jp/sanitary/01/>(No English translation is submitted but concise explanation of the relevance be found in the specification).

Sanko Co., Ltd.; http://www.sanko-wild.com/animal/c_833.htm, retrieved on Nov. 27, 2018, which is a corresponding page to NPL3 disclosed on the p. 2 of the specification, Sanko Co., Ltd.; search performed Apr. 10, 2017; Internet <http://www.sanko-wild.com/animal/c_833.htm> (No English translation is submitted but concise explanation of the relevance be found in the specification).

* cited by examiner

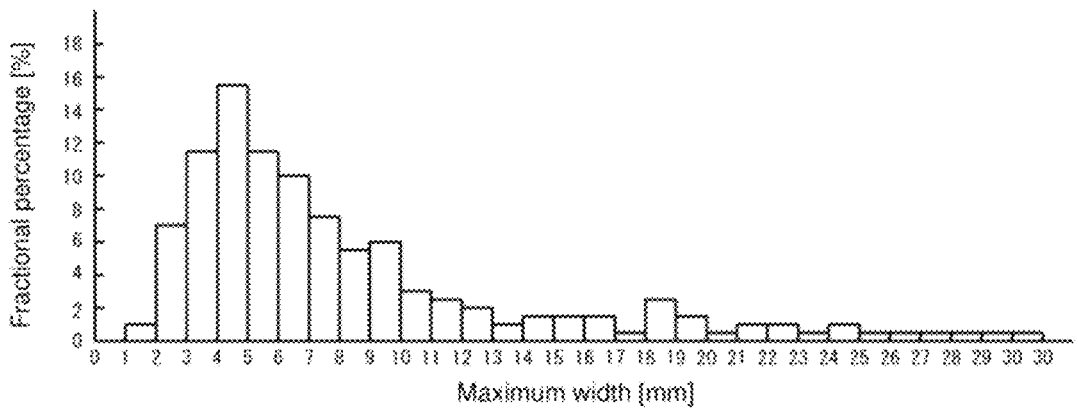
FIG. 6A
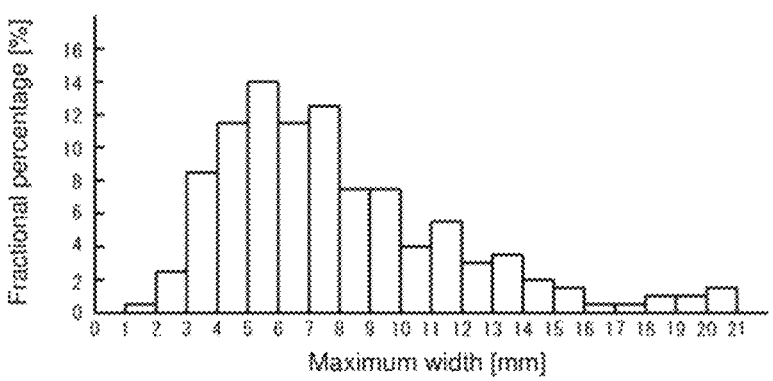
FIG. 6B
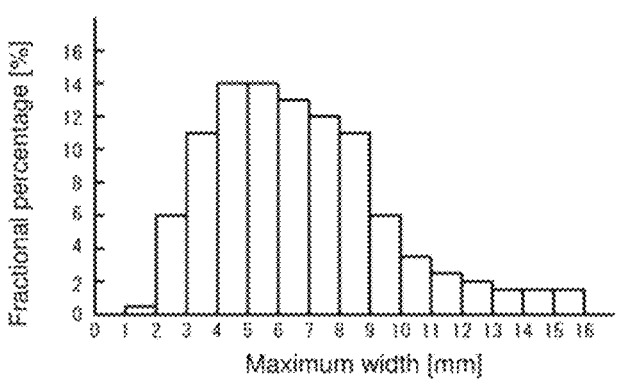
FIG. 6C
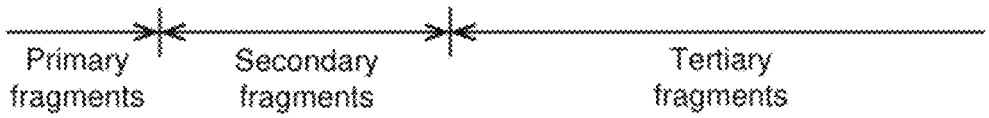

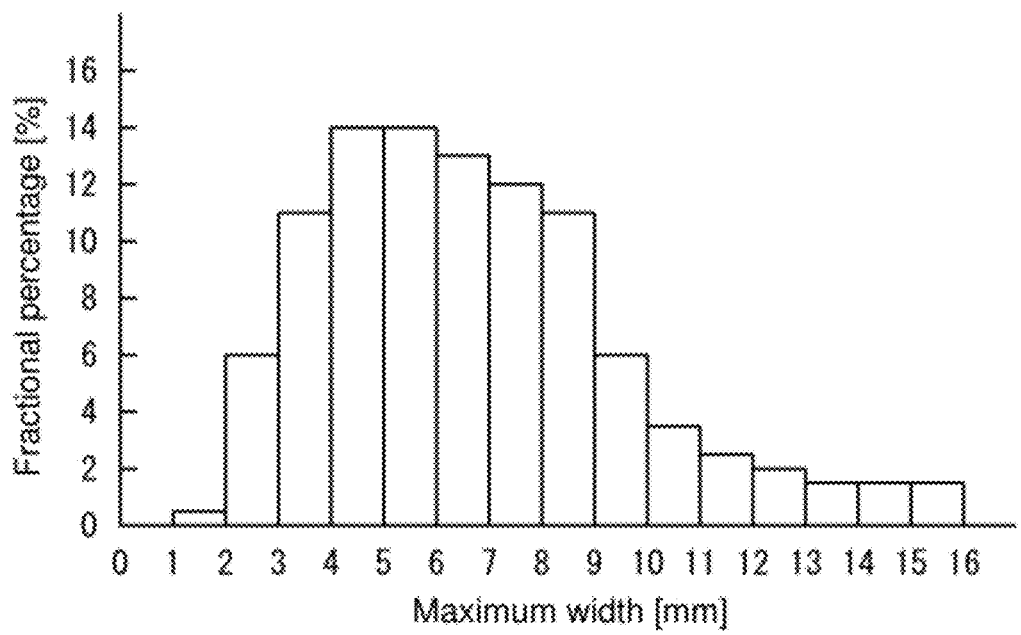
FIG. 9A
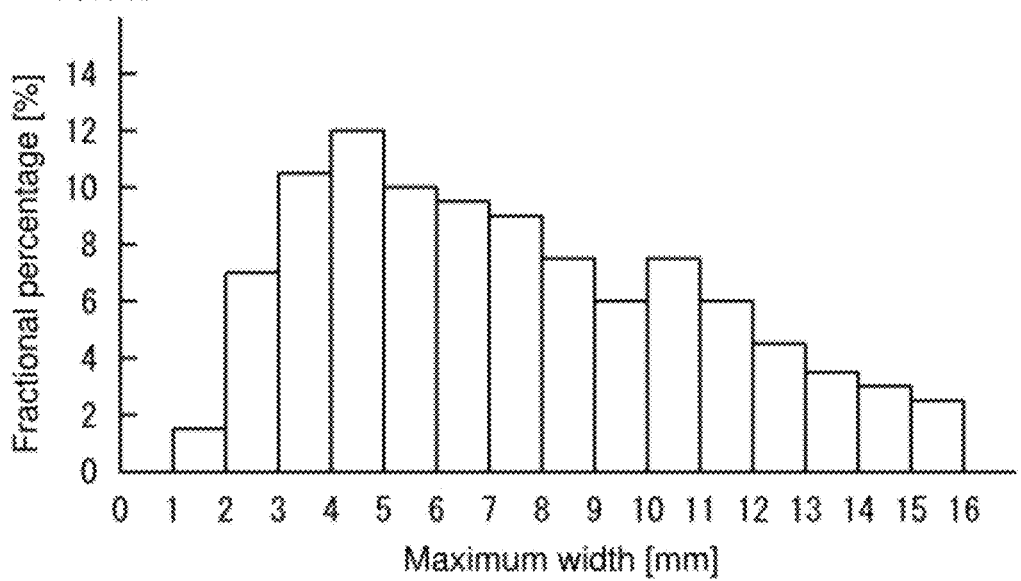
FIG. 9B

PAPER BEDDING AND PAPER BEDDING PRODUCT

TECHNICAL FIELD

The present invention relates to a bedding product and bedding that may be used as a toilet or bed for an animal pet.

BACKGROUND ART

Bedding—also referred to as litter—is strewn over the floor of a cage when used as a toilet or bed during care of a cat, rabbit, or hamster. Because it is a consumable item that must be replaced periodically, and because the aforementioned animals are increasingly popular as pets, inasmuch as they can be easily cared for indoors at low cost, demand for such bedding has been increasing.

Sawdust, wood chips, grass, cotton, paper, and so forth have conventionally been used as raw materials for bedding and have been sold as products. Thereamong, paper products have been highly popular not only because of their good heat retaining properties but also because they present no danger in terms of provoking allergic symptoms in pets. Typical of paper bedding is those such as are disclosed at Nonpatent Reference No. 1 in which a shredder is used to cut the material into long thin strips; and besides commercial products, there are also those that are employed which are such that the pet owner, for example, has himself or herself used a shredder, scissors, or the like to cut newspaper into long thin strips. When such bedding is strewn thereabout, because the fractional percentage of gaps, i.e., portions where air is present, is high, this will have good cushioning characteristics.

Furthermore, among paper bedding products, there is bedding for which ingenuity has been employed to enhance properties by causing pieces of paper sheets to be molded into special shapes. For example, Nonpatent Reference No. 2 discloses paper bedding that is molded into granular form and that contains recycled paper and Kumazasa bamboo fibers in addition to the primary component which is pulp. This is a situation in which ingenuity with regard to shape has been employed to suppress generation of dust, which is a problem that is peculiar to paper bedding. Furthermore, because this can be strewn within the cage in such fashion that there are few gaps due to the fact that this is formed into small granules, improvement in hygroscopicity can also be expected.

Thus, while the paper beddings disclosed at Nonpatent Reference No. 1 and Nonpatent Reference No. 2 do make consideration for cushioning characteristics, nongeneration of dust, and hygroscopicity, they are not in a form suited to hole-digging behavior, which is a common habit among animal pets.

In contradistinction hereto, the paper bedding indicated at Nonpatent Reference No. 3 is known as a paper bedding which is suited to hole-digging behavior. This paper bedding is such that a plurality of sheets of thin paper are stacked together and are compressed and cut into sticks of constant shape, this paper bedding being in a form that is suited to hole-digging behavior, since unraveling thereof by an animal pet causes it to take on a fluffy cotton-wadding-like appearance.

PRIOR ART REFERENCES

Nonpatent References

Nonpatent Reference No. 1:
  Gex Co., Ltd.; search performed 10 Apr. 2017; Internet <https://www.gex-fp.co.jp/animal/catalog/haming/kaiteki-mat.html>
Nonpatent Reference No. 2:
  Petline Co., Ltd.; search performed 10 Apr. 2017; Internet <http://www.petline.co.jp/sanitary/01/>
Nonpatent Reference No. 3:
  Sanko Co., Ltd.; search performed 10 Apr. 2017; Internet <http://www.sanko-wild.com/animal/c_833.htm>

SUMMARY OF INVENTION

Problem to be Solved by Invention

However, because whether an animal pet will unravel bedding depends on the individual, it is not necessarily the case that the paper bedding indicated at Nonpatent Reference No. 3 will be used in a form that is suitable for hole-digging behavior. Furthermore, while the pet owner might unravel the bedding in place of the animal pet, because bedding is a consumable item that must be periodically replaced, this would be troublesome. In addition, because the paper bedding indicated at Nonpatent Reference No. 3 is molded into a special shape, i.e., that of a stick having a multilayer structure, it is expensive.

The present invention was conceived in light of such conventional circumstances. It is an object of the present invention to provide a bedding and a bedding product that in addition to having good hygroscopicity and cushioning characteristics are suited to the hole-digging behavior of animal pets and can be manufactured at low cost without the need to carry out molding into special shapes.

Means for Solving Problem and Benefit of Invention

Bedding associated with a first aspect of the present invention is capable of being used as a toilet or bed for an animal pet and is characterized in that the bedding comprises a plurality of fragments of deciduous hardwood pulp sheeting; both faces of each of the fragments have convexities and concavities produced by indentation and cracking; a sectional face of each of the fragments is covered by pulp fibers that protrude from an interior of the fragment; the fragments are such that fractional percentage of fragments for which length of a longest distance from one sectional face to another sectional face is less than 5 mm is 25% to 36%, fractional percentage of fragments for which this is greater than or equal to 5 mm but less than 10 mm is 39% to 48%, fractional percentage of fragments for which this is greater than or equal to 10 mm but less than 15 mm is 9% to 18%, fractional percentage of fragments for which this is greater than or equal to 15 mm but less than 20 mm is 5% to 10%, fractional percentage of fragments for which this is greater than or equal to 20 mm but less than 25 mm is 2% to 6%, fractional percentage of fragments for which this is greater than or equal to 25 mm but less than 30 mm is 1% to 4%, and fractional percentage of fragments for which this is greater than or equal to 30 mm is 0% to 2%; and density is 0.03 g/cm$^3$ to 0.06 g/cm$^3$. The foregoing constitution makes it possible to provide bedding in which fragments are capable of being easily and inexpensively manufactured using a hammermill, and which is provided with good cushioning characteristics, good hygroscopicity, and good suitability for hole-digging behavior.

Bedding associated with a second aspect of the present invention is capable of being used as a toilet or bed for an animal pet and is characterized in that the bedding comprises a plurality of fragments of deciduous hardwood pulp sheeting; both faces of each of the fragments have convexities and concavities produced by indentation and cracking; a sectional face of each of the fragments is covered by pulp fibers that protrude from an interior of the fragment; the fragments are such that fractional percentage of fragments for which length of a longest distance from one sectional face to another sectional face is less than 5 mm is 22% to 28%, fractional percentage of fragments for which this is greater than or equal to 5 mm but less than 10 mm is 47% to 54%, fractional percentage of fragments for which this is greater than or equal to 10 mm but less than 15 mm is 15% to 19%, fractional percentage of fragments for which this is greater than or equal to 15 mm but less than 20 mm is 5% to 8%, and fractional percentage of fragments for which this is greater than or equal to 20 mm is 0% to 3%; and density is 0.03 g/cm$^3$ to 0.06 g/cm$^3$. The foregoing constitution makes it possible to provide bedding in which fragments are capable of being easily and inexpensively manufactured using a hammermill, and which is provided with good cushioning characteristics, good hygroscopicity, and good suitability for hole-digging behavior.

Bedding associated with a third aspect of the present invention is capable of being used as a toilet or bed for an animal pet and is characterized in that the bedding comprises a plurality of fragments of deciduous hardwood pulp sheeting; both faces of each of the fragments have convexities and concavities produced by indentation and cracking; a sectional face of each of the fragments is covered by pulp fibers that protrude from an interior of the fragment; the fragments are such that fractional percentage of fragments for which length of a longest distance from one sectional face to another sectional face is less than 5 mm is 29% to 41%, fractional percentage of fragments for which this is greater than or equal to 5 mm but less than 10 mm is 46% to 57%, fractional percentage of fragments for which this is greater than or equal to 10 mm but less than 15 mm is 10% to 13%, and fractional percentage of fragments for which this is greater than or equal to 15 mm is 0% to 3%; and density is 0.03 g/cm$^3$ to 0.06 g/cm$^3$. The foregoing constitution makes it possible to provide bedding in which fragments are capable of being easily and inexpensively manufactured using a hammermill, and which is provided with good cushioning characteristics, good hygroscopicity, and good suitability for hole-digging behavior.

A bedding product associated with a fourth aspect of the present invention comprises bedding that is capable of being used as a toilet or bed for an animal pet and that is characterized in that the bedding comprises a plurality of fragments of deciduous hardwood pulp sheeting; both faces of each of the fragments have convexities and concavities produced by indentation and cracking; a sectional face of each of the fragments is covered by pulp fibers that protrude from an interior of the fragment; the fragments are such that fractional percentage of fragments for which length of a longest distance from one sectional face to another sectional face is less than 5 mm is 25% to 36%, fractional percentage of fragments for which this is greater than or equal to 5 mm but less than 10 mm is 39% to 48%, fractional percentage of fragments for which this is greater than or equal to 10 mm but less than 15 mm is 9% to 18%, fractional percentage of fragments for which this is greater than or equal to 15 mm but less than 20 mm is 5% to 10%, fractional percentage of fragments for which this is greater than or equal to 20 mm but less than 25 mm is 2% to 6%, fractional percentage of fragments for which this is greater than or equal to 25 mm but less than 30 mm is 1% to 4%, and fractional percentage of fragments for which this is greater than or equal to 30 mm is 0% to 2%; and density is 0.03 g/cm$^3$ to 0.06 g/cm$^3$; and a package that packages the bedding; the bedding product being characterized in that there is a description on the package to the effect that it is suitable for use with an animal pet that has a penchant for hole-digging behavior. The foregoing constitution makes it possible to provide bedding that is associated with the present invention in the form of a bedding product suitable for animal pets that display a penchant for hole-digging.

A bedding product associated with a fifth aspect of the present invention comprises bedding that is capable of being used as a toilet or bed for an animal pet and that is characterized in that the bedding comprises a plurality of fragments of deciduous hardwood pulp sheeting; both faces of each of the fragments have convexities and concavities produced by indentation and cracking; a sectional face of each of the fragments is covered by pulp fibers that protrude from an interior of the fragment; the fragments are such that fractional percentage of fragments for which length of a longest distance from one sectional face to another sectional face is less than 5 mm is 22% to 28%, fractional percentage of fragments for which this is greater than or equal to 5 mm but less than 10 mm is 47% to 54%, fractional percentage of fragments for which this is greater than or equal to 10 mm but less than 15 mm is 15% to 19%, fractional percentage of fragments for which this is greater than or equal to 15 mm but less than 20 mm is 5% to 8%, and fractional percentage of fragments for which this is greater than or equal to 20 mm is 0% to 3%; and density is 0.03 g/cm$^3$ to 0.06 g/cm$^3$; and a package that packages the bedding; the bedding product being characterized in that there is a description on the package to the effect that it is suitable for use with an animal pet that has a penchant for hole-digging behavior. The foregoing constitution makes it possible to provide bedding that is associated with the present invention in the form of a bedding product suitable for animal pets that display a penchant for hole-digging.

A bedding product associated with a sixth aspect of the present invention comprises bedding that is capable of being used as a toilet or bed for an animal pet and that is characterized in that the bedding comprises a plurality of fragments of deciduous hardwood pulp sheeting; both faces of each of the fragments have convexities and concavities produced by indentation and cracking; a sectional face of each of the fragments is covered by pulp fibers that protrude from an interior of the fragment; the fragments are such that fractional percentage of fragments for which length of a longest distance from one sectional face to another sectional face is less than 5 mm is 29% to 41%, fractional percentage of fragments for which this is greater than or equal to 5 mm but less than 10 mm is 46% to 57%, fractional percentage of fragments for which this is greater than or equal to 10 mm but less than 15 mm is 10% to 13%, and fractional percentage of fragments for which this is greater than or equal to 15 mm is 0% to 3%; and density is 0.03 g/cm$^3$ to 0.06 g/cm$^3$; and a package that packages the bedding; the bedding product being characterized in that there is a description on the package to the effect that it is suitable for use with an animal pet that has a penchant for hole-digging behavior. The foregoing constitution makes it possible to provide bedding that is associated with the present invention in the form of a bedding product suitable for animal pets that display a penchant for hole-digging.

BRIEF DESCRIPTION OF DRAWINGS

FIG. 6 Histograms showing size distribution of fragments manufactured using a hammermill, FIG. 6A being a histogram showing size distribution of fragments manufactured using a mesh screen in which diameter of hole openings was 30 mm, FIG. 6B being a histogram showing size distribution of fragments manufactured using a mesh screen in which diameter of hole openings was 20 mm, and FIG. 6C being a histogram showing size distribution of fragments manufactured using a mesh screen in which diameter of hole openings was 15 mm.

FIG. 9 Histograms showing size distribution of fragments manufactured using a mesh screen in which diameter of hole openings was 15 mm, FIG. 9A being a histogram showing size distribution of fragments manufactured using a hammermill, and FIG. 9B being a histogram showing size distribution of fragments manufactured using a cutting mill.

EMBODIMENTS FOR CARRYING OUT INVENTION

Figure 1:
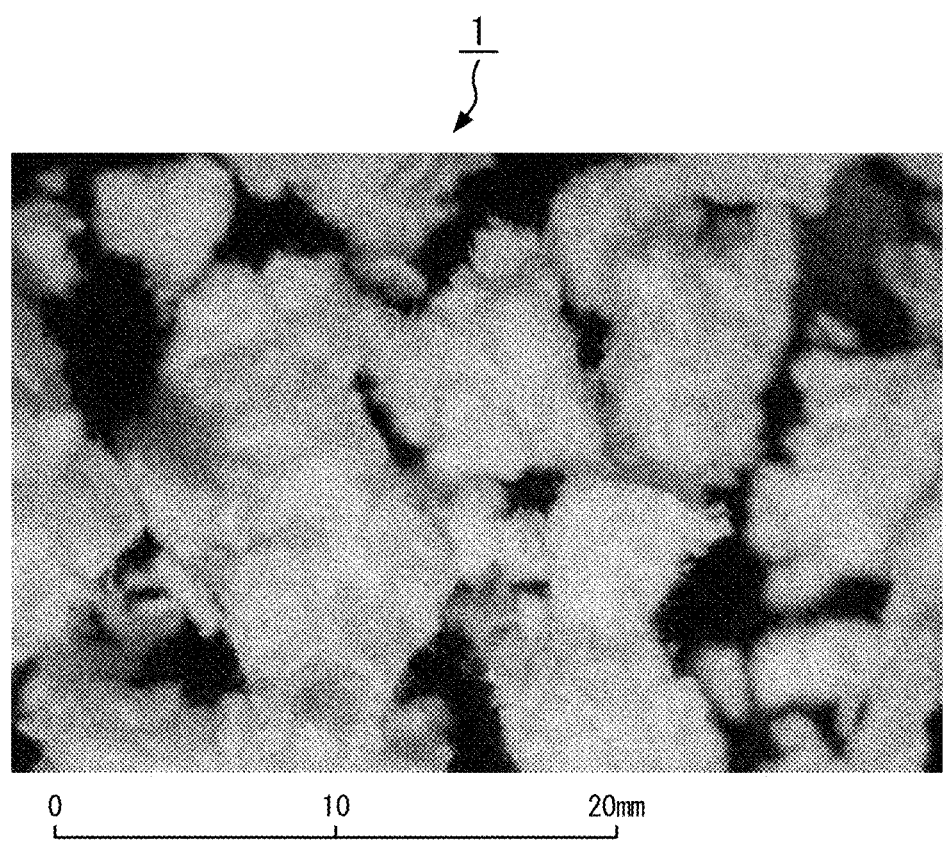
FIG. 1 Drawing showing external appearance of bedding associated with an embodiment in which the present invention has been applied.

Below, embodiments of the present invention are described in detail with reference to results of testing. Note that as the following embodiments are examples of bedding and bedding products that are being presented for the purpose of providing specific implementations of the technical ideas of the present invention, and should not be construed to limit the bedding and bedding products of the present invention to the following. Furthermore, the present specification should not be construed as limiting the components recited in the claims to the components of the embodiments. In particular, except where otherwise specifically described as limiting, the scope of the present invention should not be understood as being limited only to the dimensions, materials, shapes, and so forth of the constituent parts, or to the relative arrangements thereamong, which are described at the embodiments, as these are merely examples which are provided only for illustrative purposes. Note that the size, positional relationship, and so forth of the components shown in the various drawings may in some cases be exaggerated for clarity of description. Moreover, in the description which follows, note that like or corresponding components are assigned like names and reference numerals and that detailed description thereof is omitted for convenience.

Bedding 1

FIG. 1 is a drawing showing the external appearance of bedding 1 associated with an embodiment of the present invention. This bedding 1 shown in FIG. 1 is an aggregation of fragments 11 formed by using a hammermill HM to pulverize and break up pulp sheeting comprising deciduous hardwood into pieces of irregular shape.

The raw material for fragments 11 constituting bedding 1 might, for example, be beech, acacia, Japanese oak, Japanese white birch, eucalyptus, oak, poplar, alder, and/or other such deciduous hardwood, pulp sheeting manufactured from acacia being employed in the present embodiment. Because the fibers of deciduous hardwood are thinner and shorter than those of softwood, the cushioning characteristics thereof are good when this is employed as bedding. Furthermore, because pulp sheeting is thicker than paper, bedding manufactured from pulp sheeting will have good cushioning characteristics. In addition, by employing this in the form of pulp sheeting, i.e., as this exists before being made into paper, it is possible to reduce manufacturing cost.

Fragments 11

Figure 2:
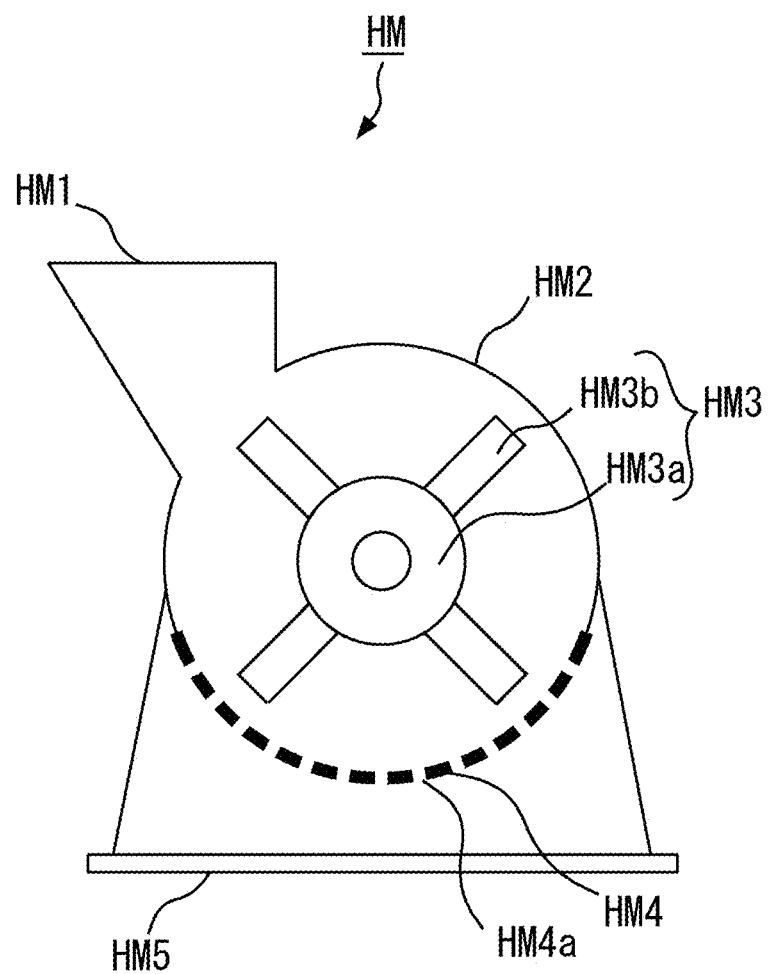
FIG. 2 Schematic diagram of a hammermill used in an embodiment in which the present invention has been applied.

Fragments 11, which are paper chips of irregular shape, constitute bedding 1 shown in FIG. 1. Fragments 11 are manufactured by using a hammermill HM (e.g., Swinging-Hammer DBS manufactured by Takeuchi Iron Works Co., Ltd.) to pulverize and break up pulp sheeting. Note that hammermill HM is a device such as that shown in FIG. 2, which comprises raw material inlet HM1, raw material processing chamber HM2, pulverizing mechanism HM3 which is provided within processing chamber HM2 and which is made up of rotor HM3a and a plurality of vanes HM3b that are provided at rotor HM3a, mesh screen HM4 which is attached at the lower portion within processing chamber HM2 and which has a multiplicity of hole openings HM4a that are, e.g., 20 mm in diameter, and outlet HM5 which is continuous with the hole openings HM4a of mesh screen HM4.

At this hammermill HM, plurality of vanes HM3b rotate at high rotational speed, e.g., a rotational speed of 2400 rpm, and deliver impacts to pulp sheeting that has been fed thereinto via inlet HM1, pulverizing and breaking it up in such fashion as to cause it to be torn. Note that pulverizing and breaking up as used herein does not refer to processing of pulp sheeting such as will cause it to be rendered into powder, but rather is used to refer specifically to processing of pulp sheeting in such fashion as to cause it to be made into fragments 11 of respectively different and irregular shapes such as are shown in FIG. 1.

Figure 3A:
FIG. 3 Drawings showing external appearance of bedding associated with an embodiment in which the present invention has been applied, FIG. 3A being a drawing showing the shape of the two faces at the bedding, and FIG. 3B being a drawing to assist in describing convexities and concavities at the two faces.
Figure 3B:
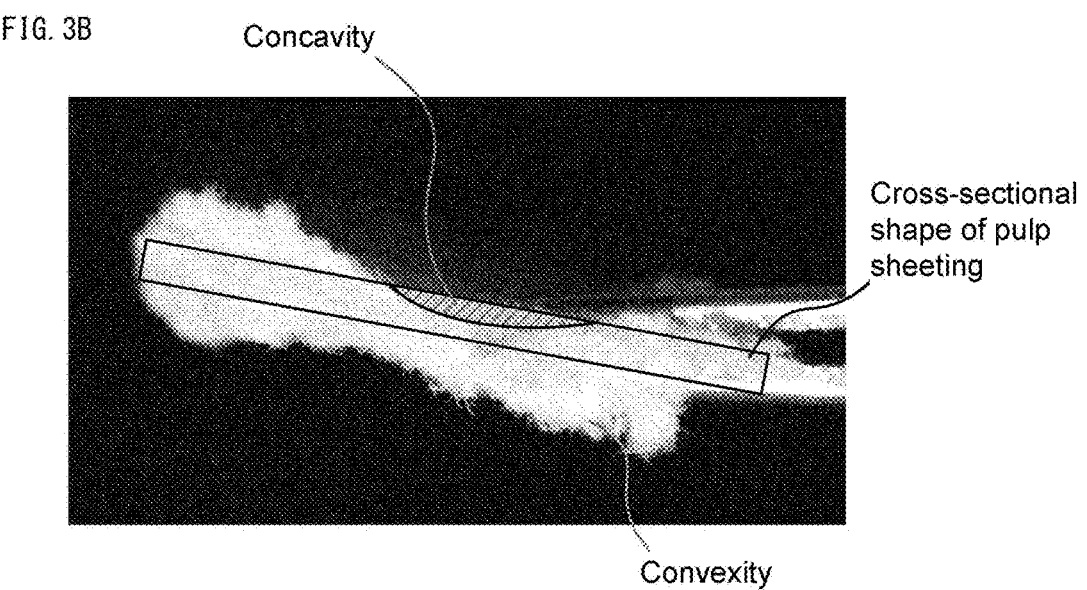
Figure 4A:
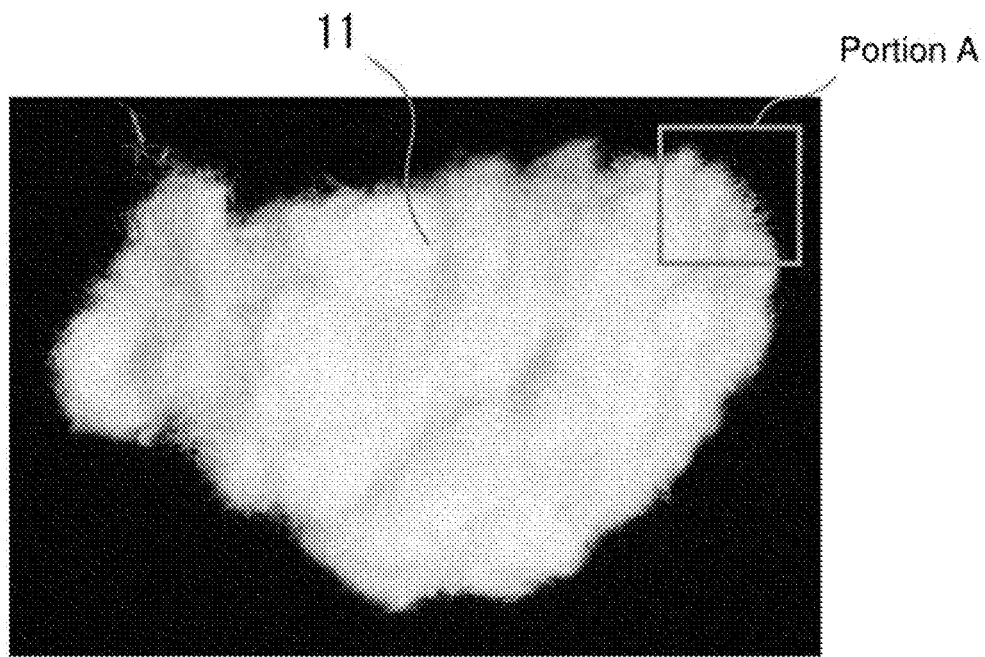
FIG. 4 Drawings showing external appearance of bedding associated with an embodiment in which the present invention has been applied, FIG. 4A being a drawing showing the shape of a sectional face at the bedding, and FIG. 4B being an enlarged view of Portion A at FIG. 4A.
Figure 4B:
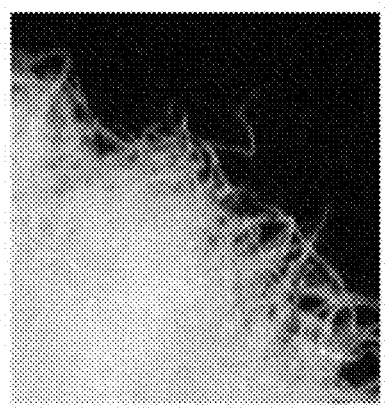

As shown in FIG. 3, as compared with the cross-section of the pulp sheeting as it existed prior to processing, the two faces of fragment 11, upon being impacted by vane(s) HM3b, are made to be nonuniformly convex and concave, there being convexities where it is made to protrude outward and there being concavities where it is depressed inward. Furthermore, as shown in FIG. 4, the cross-section of fragment 11 is such that it is covered with pulp fibers that protrude from the fragment interior. Note that these are unbroken pulp fibers that emerge in exposed fashion from the sectional face at the time that the pulp sheeting is pulverized and broken up.

Method for Manufacturing Bedding 1

Figure 5:
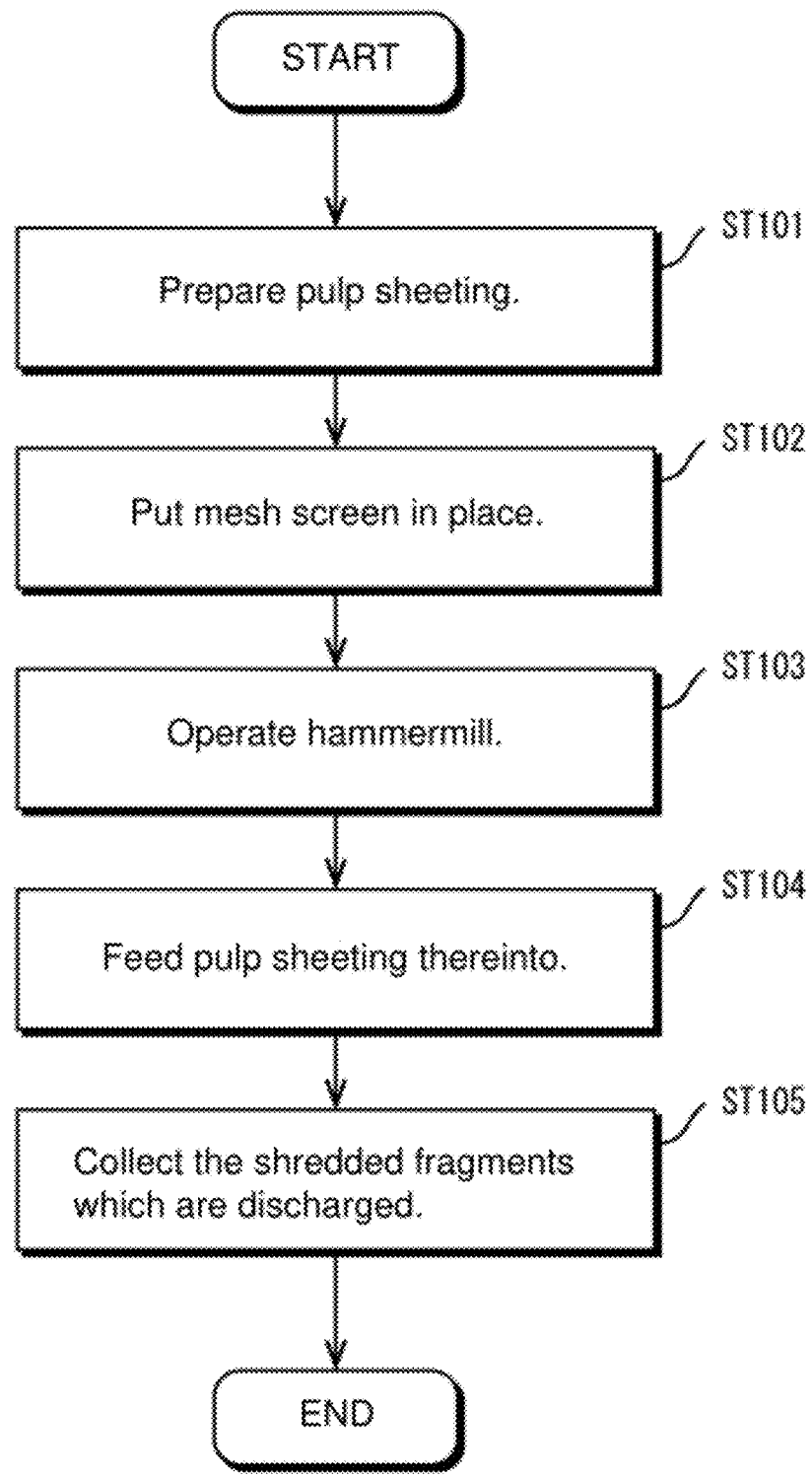
FIG. 5 Flowchart showing flow of processing in a method for manufacturing bedding associated with an embodiment in which the present invention has been applied.

Next, referring to FIG. 5, a method for manufacturing fragments 11 will be described.

First, at step ST101, pulp sheeting comprising acacia is prepared. Note, however, that pulp sheeting is not limited to that which is made from acacia.

Next, at step ST102, mesh screen HM4 is attached to the main body of hammermill HM. Note that the mesh screen HM4 which is used may have hole openings HM4a of any diameter. Furthermore, whereas description is given in terms of an example in which the hole openings of the mesh screen are circular, there is no limitation with respect thereto. In such case, what was referred to as a diameter in the foregoing description might be interpreted as a maximum width of hole opening HM4a (i.e., the length of the longest distance from one sectional face therewithin to another sectional face therewithin).

Differences in properties of bedding 1 that arise due to differences in the diameter of hole opening HM4a at mesh screen HM4 will be described below.

Next, at step ST103, hammermill HM is operated, causing rotor HM3a, and thus vanes HM3b, to rotate at a rotational speed of 2400 rpm. Note that while there is no particular limitation with respect to rotational speed, on the order of 1100 rpm to 3000 rpm is preferred.

Next, at step ST104, pulp sheeting is fed thereinto from inlet HM1. As a result thereof, as the pulp sheeting is subjected to agitation by vanes HM3b which rotate at high speed, it is pulverized and broken up in such fashion as to cause it to be torn as a result of the impact which is delivered thereto when it comes in contact with vanes HM3b, forming fragments 11. This being the case, the fragments 11 that are manufactured thereby are irregular in shape.

Finally, at step ST105, a given amount of fragments 11 that have passed through hole openings HM4a of mesh screen HM4 and have been discharged from outlet HM5 are collected to form bedding 1. Note that the fragments 11 that are discharged from outlet HM5 need not necessarily be smaller than the maximum width of hole openings HM4a, it being possible, depending on the state of fragments 11 as well as on the angle thereof at the time when they arrive at mesh screen HM4, that fragments 11 that have a maximum width which is somewhat larger than that of hole openings HM4a may pass therethrough (there is little chance that fragments 11 having a maximum width that is considerably larger, e.g., two times or more larger, than hole openings HM4a will pass therethrough). Furthermore, it is not the case that a fragment 11 is necessarily discharged therefrom just because it has a maximum width that is smaller than that of a hole opening HM4a, as it is only those fragments 11 that during the agitation operation happen to arrive at mesh screen HM4 in a state which allows them to pass through the hole openings HM4a that are discharged. This being the case, even where a fragment 11 is in a state such that it would be able to pass through hole opening HM4a, it is sometimes the case that it fails to reach mesh screen HM4 and is repeatedly agitated, pulverized, and broken up, producing a fragment that is smaller than hole opening HM4a by an amount corresponding to one or more rounds of processing.

As described above, because there are few operations, and because the only necessary material is pulp sheeting, it is possible to manufacture bedding 1 at low cost.

Size Distribution of Fragments 11 within Bedding 1

While fragments 11 making up bedding 1 associated with an embodiment of the present invention are of respectively different and irregular shapes as has been described above, a certain trend may be observed with respect to the size distribution thereof. That trend is described below with reference to FIG. 6. Note that size distribution is used herein to refer to the frequency distribution of fragments 11 in bedding 1 as a function of the maximum width thereof.

FIG. 6 is a histogram that was made by extracting fragments 11 at random from bedding 1 and measuring the maximum widths thereof, FIGS. 6A through 6C respectively being examples of histograms of fragments 11 manufactured in accordance with the aforementioned method using mesh screens HM4 in which diameter of the hole openings HM4a was 30 mm, 20 mm, and 15 mm. Note that the horizontal axis employs 1-mm increments (class width). Furthermore, where the upper limit of the length at the horizontal axis, i.e., the upper limit of the maximum width of fragments 11, varies, this is due to the fact that the fragments 11 which are discharged therefrom are limited by the size of hole openings HM4a.

Upon comparison of FIGS. 6A through 6C, it is found that the location of the peak, as well as the manner of increase leading up to the peak and the manner of decrease following the peak, are common to each. In more specific terms, the peak occurs between 4 mm and 6 mm, there is a logarithmic increase leading up to the peak, and there is an exponential decrease after going past the peak. Furthermore, beyond 14 mm to 15 mm, the fractional percentage converges on a more or less constant value. Hereinafter, for convenience of description, fragments 11 on the way up to the peak (approximately less than 4 mm to 6 mm) shall be defined as primary fragments, fragments 11 from where the peak is exceeded up to where the fractional percentage converges on a more or less constant value (approximately greater than or equal to 4 mm to 6 mm but less than 14 mm to 15 mm) shall be defined as secondary fragments, and fragments 11 thereeybeyond (approximately greater than or equal to 14 mm to 15 mm) shall be defined as tertiary fragments.

When this is done, it is found that, regardless of the diameter of hole opening HM4a, bedding 1 is mostly made up of primary fragments and secondary fragments. That is, it is fair to say that the tertiary fragments are responsible for the differences in properties that are exhibited in bedding 1 manufactured using different mesh screens HM4. With this in mind, evaluation of bedding 1 is carried out below from three standpoints, i.e., hygroscopicity, cushioning characteristics, suitability for hole-digging behavior, and manufacturing cost.

Hygroscopicity

Under the present heading, the following test procedure was used to determine the amount of water absorbed per 1 $cm^3$ of paper material, hygroscopicity of bedding 1 being evaluated using this amount of water absorbed.

Test Procedure

First, samples that were each 500 $cm^3$ in volume were obtained by extracting fragments 11 in random fashion from bedding 1. This was carried out for bedding 1 manufactured using mesh screens HM4 in which diameter of the hole openings HM4a was 30 mm, 20 mm, and 15 mm to prepare five samples from each.

Next, the weights of samples that had not been allowed to absorb water and the weights of samples that had been allowed to absorb water were measured. By subtracting the weights of those that had not been allowed to absorb water from the weights of those that had been allowed to absorb water, it was possible to determine the amount of water absorbed per 500 $cm^3$ volume thereof. Note that samples that had been allowed to absorb water were prepared by soaking the entire sample in water and thereafter using a sieve to allow water to drain therefrom without going to any special effort to wring out or shake off the water therefrom. As a result of doing this, it was possible to cause removal of only that water which had not been absorbed by fragments 11, e.g., moisture adhering to the surface of fragment 11 and so forth, and to accurately determine the amount of water absorbed.

This was carried out five times for each sample and the average thereof determined. And finally, by dividing the average value by 500 cm$^3$, it was possible to calculate the amount of water absorbed per 1 cm$^3$.

Test Results and Evaluation Thereof

TABLE 1 summarizes the amount of water absorbed by bedding 1 as determined in accordance with the aforementioned testing, these results being used below to evaluate the hygroscopicity of bedding 1.

From TABLE 1, it is clear that bedding 1 manufactured using a mesh screen HM4 in which the diameter of the hole openings HM4a was large tended to have high hygroscopicity.

When bedding is manufactured using a cutting mill, shredder, or other such device having blade(s), because bedding that contains many small fragments will typically be capable of being strewn about more densely, i.e., in such fashion that there are fewer gaps (portions where air is present) incapable of absorbing water, the amount of water absorbed will be high.

However, as shown in FIG. 4, because fragments 11 manufactured using a hammermill HM are manufactured such that that they are pulverized and broken up in such fashion as to cause them to be torn as a result of the impact delivered thereto when they come in contact with vanes HM3b, the edge of the sectional face has a cotton-wadding-like appearance, which is to say that it is in a state in which it has become unraveled at the level of the pulp fibers, portions where air is present being contained therewithin. That is, the amount of water absorbed by this cotton-wadding-like portion is less than is the case within the range over which the pulp fibers are densely packed (portion at the center of fragment 11). Furthermore, because the range over which the cotton-wadding-like region is present depends on the intensity of the impact delivered thereto by vanes HM3b, the range over which the cotton-wadding-like region is present at fragment 11 is more or less constant regardless of maximum width. That is, the smaller the maximum width at the fragment 11, the smaller will be the range over which the pulp fibers are densely packed, and the smaller will be the amount of water that is absorbed. It is thought that this is why, with fragments 11 manufactured using a hammermill HM, bedding 1 that was manufactured using a mesh screen HM4 in which the diameter of the hole openings HM4a was large, and that contained a larger number of fragments 11 which had large maximum widths, had high hygroscopicity.

Here, hygroscopicity was evaluated based on the amount of urine discharged by a cat, cats being of relatively large body size for an animal pet that is cared for indoors. The amount of urine produced by an adult (having a body weight of approximately 3.5 kg to 4.5 kg) cat in a single day is 35 g to 135 g, it being hypothesized that this urine would permeate bedding 1 over a circular region 10 cm in diameter. This is an amount that is capable of easily being absorbed by 6 cm of bedding 1 strewn thereabout. Furthermore, because animals that display a penchant for hole-digging behavior, this being the focus of an object of the present invention, e.g., animal pets such as hamsters and hedgehogs, have bodies which are smaller than, and produce a smaller amount of urine than, cats, this means that it will be all the more easily absorbed thereby.

Based on the foregoing, bedding 1 may be evaluated from the standpoint of hygroscopicity as being capable of being used favorably.

TABLE 1

| | Diameter of hole openings at mesh screen [mm] | | |
|---|---|---|---|
| | 15 | 20 | 30 |
| Amount of water absorbed per 500 cm$^3$ [g] | 150.1 | 150.3 | 161.7 |
| Water absorption [g/cm$^3$] | 0.30 | 0.30 | 0.32 |

Cushioning Characteristics

Figure 7:
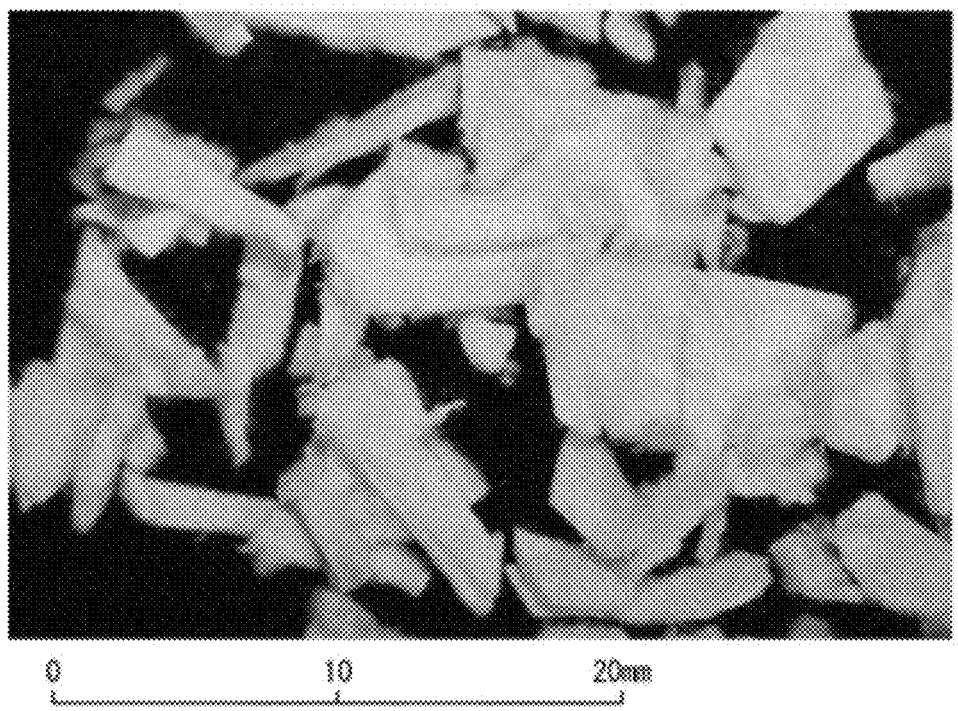
FIG. 7 Drawing showing external appearance of bedding comprising fragments manufactured using a cutting mill.

Under the present heading, cushioning characteristics of bedding 1 were evaluated by carrying out comparison with bedding manufactured using a cutting mill, which would permit manufacturing at low cost, in similar fashion as at bedding 1. Note that FIG. 7 shows a drawing of the external appearance of bedding manufactured using a cutting mill CM. Regarding drawings of the external appearance of bedding 1, reference is made to FIG. 1.

Figure 8:
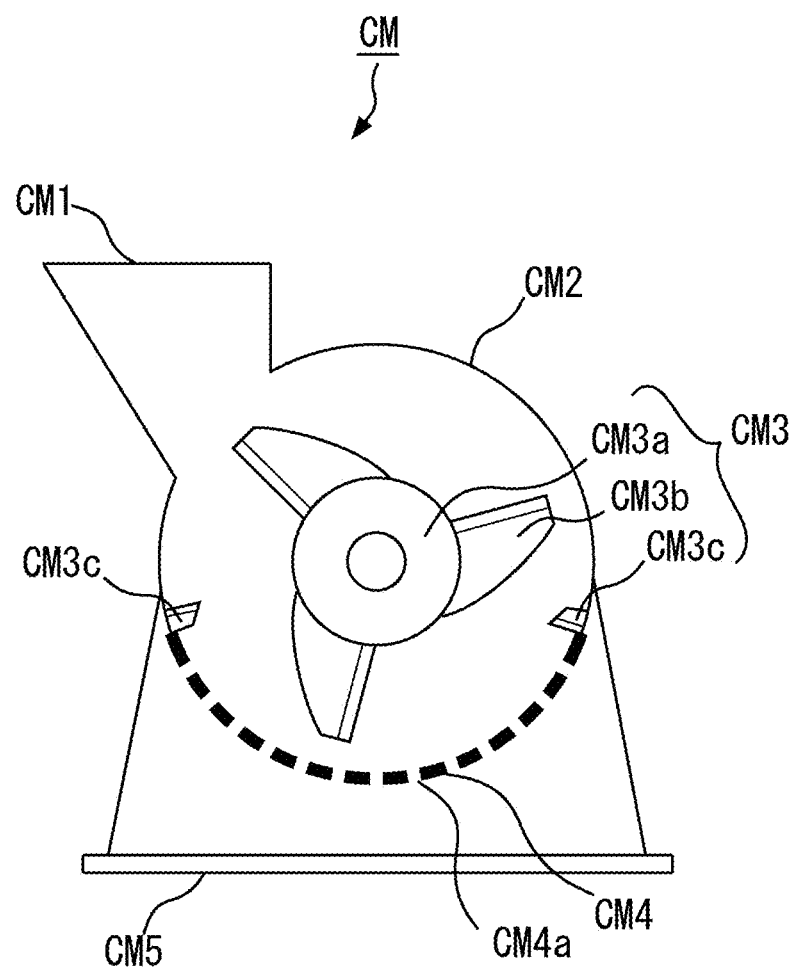
FIG. 8 Schematic diagram of a cutting mill.

Furthermore, as shown in FIG. 8, cutting mill CM is a device constituted such that the pulverizing mechanism HM3 of hammermill HM has been replaced by cutting mechanism CM3. Cutting mechanism CM3 comprises rotor CM3a, a plurality of rotating blades CM3b which are provided at rotor CM3a, and stationary blades CM3c which are secured to processing chamber CM2. At this cutting mill CM, rotating blades CM3b and stationary blades CM3c cut pulp sheeting that is fed thereinto from inlet CM1. For this reason, fragments manufactured using cutting mill CM are highly planar and there is little raggedness due to pulp fibers at broken surfaces.

First, bedding 1 manufactured using hammermill HM feels fluffy when touched and is capable of imparting a sensation of softness. Furthermore, because bedding 1 manufactured using a mesh screen HM4 in which the diameter of hole openings HM4a is small will be such that there are few fragments 11 that have large maximum widths, it will feel soft.

In contradistinction thereto, bedding manufactured using a cutting mill CM is such that each individual fragment retains its distinctive hardness, and the bedding formed thereby produces a somewhat hard sensation when touched.

There are three conceivable reasons to explain why such a difference in the feel of bedding 1 manufactured using a hammermill HM and bedding manufactured using a cutting mill CM might arise.

The first is that this is due to a difference in the hardness of the individual fragments. Because, as described above, bedding 1 manufactured using hammermill HM is made up of pulp sheeting that has been pulverized and broken up in such fashion as to cause it to be torn as it is subjected to impacts delivered thereto by vanes HM3b, fragments 11 are made softer than when they existed as pulp sheeting due to the impact(s) delivered thereto. In contradistinction thereto, because bedding manufactured using a cutting mill CM is made up of pulp sheeting that has been cut by high-speed rotating blades CM3b and by stationary blades CM3c without being subjected to impact, it has approximately the same hardness as when it existed as pulp sheeting. It is therefore only natural that bedding 1 manufactured using a hammermill HM, in which the respective fragments are soft, will have better cushioning characteristics.

The second is that this is due to a difference in the size distribution of fragments 11 within bedding 1. FIG. 9 contains graphs for comparing the size distributions of bedding 1 manufactured using a hammermill HM and bedding manufactured using a cutting mill CM, FIG. 9A showing a histogram of fragments 11 manufactured using hammermill HM (identical to that at FIG. 6C), and FIG. 9B showing a histogram of fragments manufactured using cutting mill CM, both being data for the situation in which the diameter of the hole openings at the mesh screen was 15 mm.

Based on these, it can be seen that the manner of decrease following the peak is such that whereas this decreases in exponential fashion at FIG. 9A, this decreases in first-order (linear) fashion at FIG. 9B. That is, it is fair to say that the fractional percentage of secondary fragments and tertiary fragments is greater in bedding manufactured using a cutting mill CM than in bedding 1 manufactured using a hammermill HM. Because, as described above, the situation that exists when there are few fragments 11 that have large maximum widths is better able to produce a perception of softness, bedding 1 manufactured using a hammermill HM will have better cushioning characteristics.

The third is that this is due to a difference that exists at the time that the bedding is strewn thereabout. When bedding 1 manufactured using a hammermill HM is strewn thereabout, convexities and concavities at the two faces of fragments 11 and raggedness due to pulp fibers at sectional faces permit formation of gaps between fragments 11. In contradistinction thereto, because, as is clear from the drawing showing external appearance at FIG. 8, bedding manufactured using a cutting mill CM is highly planar and there is little raggedness due to pulp fibers at sectional faces, there is little tendency for formation of gaps between fragments. That this is so is also clear from the fact that, as indicated at TABLE 2, the density of bedding 1 manufactured using a hammermill HM is lower than that of bedding manufactured using a cutting mill CM.

Because such gaps, i.e., portions where air is present, improve cushioning characteristics, bedding 1 manufactured using a hammermill HM, for which there will be many gaps when this is strewn about, will have better cushioning characteristics.

TABLE 2

| | Diameter of hole openings at mesh screen [mm] | | | | | |
| --- | --- | --- | --- | --- | --- | --- |
| | Hammermill | | | Cutting mill | | |
| | 15 | 20 | 30 | 15 | 20 | 30 |
| Weight per 500 cm$^3$ [g] | 22.7 | 24.0 | 24.5 | 56.4 | 64.2 | 67.9 |
| Density [g/cm$^3$] | 0.045 | 0.048 | 0.049 | 0.11 | 0.13 | 0.14 |

Based on the foregoing, cushioning characteristics thereof being better than those of bedding manufactured using a cutting mill, bedding 1 may be evaluated from the standpoint of cushioning characteristics as well as being capable of being used favorably.

Suitability for Hole-Digging Behavior

Under the present heading, evaluation was carried out with respect to suitability for hole-digging behavior. Note further that evaluation by comparison with bedding manufactured using a cutting mill CM was also carried out under the present heading. Here, to serve as an environment suited to hole-digging behavior for hamsters, hedgehogs, and other such animal pets on which use of the present invention is predicated, (1) that the bedding is very safe, (2) that the bedding can be strewn about in such fashion as to achieve good thickness, (3) that holes produced when hole-digging behavior is engaged in do not collapse, and so forth will be important. With regard to (1), this is due to the fact that bedding such as will tend not to cause injury to the eyes is desirable because the eyes of the aforementioned animal pets protrude from the bodies thereof and are easily injured. With regard to (2) and (3), these are due to the fact that because it is frequently the case that hole-digging behavior is engaged in for the purpose of creating a burrow, it is important that the environment be such as to facilitate burrow creation.

Bedding 1 manufactured using a hammermill HM and bedding manufactured using a cutting mill CM are compared below from these standpoints.

First, as shown in FIG. 1, bedding 1 manufactured using hammermill HM is such that the sectional faces thereof are not sharp, the respective fragments being soft, as has been described above. For this reason, even if fragment 11 should happen to come in contact with the eye of an animal pet, it will tend not to cause injury to the eye. Furthermore, because fragments 11 are such that there are convexities and concavities at the two faces thereof and have much raggedness due to pulp fibers at sectional faces, this permits formation of gaps between fragments 11, making it possible for even a small amount thereof to be strewn about in such fashion as to achieve good thickness. Furthermore, because friction is high due to the shape of fragment 11, holes produced as a result of hole-digging tend not to collapse Regarding the amount that has to be strewn thereabout so as to achieve good thickness and the degree to which holes tended not to collapse, note that almost no difference was observed depending on the diameter of hole opening HM4a at mesh screen HM4. Accordingly, it is fair to say that, bedding 1 that is manufactured using a mesh screen HM4 in which the diameter of the hole openings HM4a is small, for which the cushioning characteristics of the bedding 1 are better, will be bedding that is suitable for hole-digging behavior.

In contradistinction thereto, as shown in FIG. 7, bedding manufactured using a cutting mill CM is such that sectional faces are linear and sharp, and as has been described above is such that the respective fragments retain the hardness they had at the time when they existed as pulp sheeting. For this reason, if the fragment were to come in contact with the eye of an animal pet, there is a danger that it would cause injury to the eye. Furthermore, because bedding manufactured using a cutting mill CM is highly planar and there is little raggedness due to pulp fibers at sectional faces, there is little tendency for formation of gaps between fragments, and a large amount of bedding must be strewn about to achieve a good thickness. And from the perspective of cost as well, this can hardly be said to be preferred. Furthermore, because, based on the shape of the fragment, friction is not very high, holes produced as a result of hole-digging tend to collapse.

Based on the foregoing, inasmuch as it is bedding which is more suited to hole-digging behavior than bedding manufactured using a cutting mill, bedding 1 may be evaluated from this standpoint as well as being capable of being used favorably.

Manufacturing Cost

Under the present heading, evaluation of bedding 1 was carried out from the standpoint of manufacturing cost. As compared, for example, with the bedding indicated at Nonpatent Reference No. 2 and Nonpatent Reference No. 3, at which ingenuity is employed to enhance properties as a result of molding into special shapes, because there are few operations, and because the only necessary material is pulp sheeting, it is possible to manufacture bedding 1 at low cost.

Furthermore, comparison of beddings 1 manufactured using mesh screens HM4 having hole openings HM4a of different diameters suggests that it is generally the case that the smaller the diameter of the hole opening HM4a, the greater is the time required for manufacturing, and consequently the higher is the manufacturing cost.

Overall Evaluation

As described above, bedding 1, while capable of being manufactured at low cost, has adequate hygroscopicity; furthermore, it is fair to say that the cushioning characteristics and suitability for hole-digging behavior thereof are favorable as compared with those of bedding manufactured using a cutting mill CM.

Furthermore, results of comparison of beddings 1 manufactured using mesh screens HM4 having hole openings HM4a of different diameters were as indicated at TABLE 3. As also clear from this TABLE, cushioning characteristics and suitability for hole-digging behavior, as well as hygroscopicity and manufacturing cost, exhibit a tradeoff-type relationship with respect to the size of the hole opening HM4a at mesh screen HM4. That is, by changing the mesh screen HM4, it is possible to flexibly adjust the property or properties that one considers important at bedding 1 associated with an embodiment of the present invention

TABLE 3

| Item Being Compared | Rank |
| --- | --- |
| Cushioning Characteristics | Large hole openings are worse than small hole openings |
| Hygroscopicity | Large hole openings are better than small hole openings |
| Suitability for Hole-Digging Behavior | Large hole openings are worse than small hole openings |
| Manufacturing Cost | Large hole openings are better than small hole openings |

Bedding Product

A bedding product associated with an embodiment of the present invention comprises the aforementioned bedding 1 and a package for packaging of bedding 1. Bedding 1 might, for example, be packaged by using a compressor to compress air in such fashion as to cause the volume thereof to become 60% of what it would be at standard pressure. Because this will make it possible to package this so that it is in state in which it is more compact than when it is used, this will make it possible for less space to be required when storing it in inventory and when causing it to be transported, making it possible to suppress storage cost and transport cost.

Furthermore, the fact that bedding 1 is suitable for use with animal pets, e.g., hamsters, that display a penchant for hole-digging behavior may be written on the package. Because this will make it possible to communicate to consumers of bedding that bedding 1 is a product which is suitable for use with animal pets that display a penchant for hole-digging behavior, this will lead to promotion of sales. Note that the method employed for compression is not limited to those which are pneumatic, it being possible for hydraulic and/or motorized methods to be employed.

As described above, the present invention makes it possible to provide a bedding and a bedding product that in addition to having good hygroscopicity and cushioning characteristics are suited to the hole-digging behavior of animal pets and can be manufactured at low cost without the need to carry out molding into special shapes.

INDUSTRIAL UTILITY

Bedding in accordance with the present invention has excellent hygroscopicity and cushioning characteristics, is suitable for use with animal pets that display a penchant for hole-digging behavior, and can be manufactured at low cost, without there being any need to carry out molding into special shapes.

EXPLANATION OF REFERENCE NUMERALS

1 . . . Bedding
11 . . . Fragment
HM . . . Hammermill
HM1 . . . Inlet; HM2 . . . Processing chamber; HM3 . . . Pulverizing mechanism; HM3a . . . Rotor; HM3b . . . Vane; HM4 . . . Mesh screen; HM4a . . . Hole opening; HM5 . . . Outlet
CM Cutting mill
CM1 . . . Inlet; CM2 . . . Processing chamber; CM3 . . . Cutting mechanism; CM3a . . . Rotor; CM3b . . . Rotating blade; CM3c . . . Stationary blade; CM4 . . . Mesh screen; CM4a . . . Hole opening; . . . CM5 . . . Outlet

The invention claimed is:

1. A paper bedding that is capable of being used as a toilet or bed for an animal pet and that is characterized in that:
    the paper bedding comprises a plurality of fragments that are produced from a paper pulp sheeting of which materials are deciduous hardwood;
    both faces of each of the fragments have convexities and concavities formed by indentation and cracking;
    a sectional face of each of the fragments is covered by pulp fibers of the paper pulp sheeting that protrude from an interior of the fragment;
    the fragments satisfy a relationship between predetermined ranges of lengths (X) of the fragments and fractional percentages (Y) of the fragments contained in the paper bedding wherein
        each of the lengths of the fragments is determined by a longest distance from one sectional face to another sectional face, and
        the relationship is listed in a table below:

| Range of Lengths (X) | Fractional Percentage (Y) |
| --- | --- |
| X <5 mm | 25% to 36%, |
| 5 mm ≤ X <10 mm | 39% to 48%, |
| 10 mm ≤ X <15 mm | 9% to 18%, |
| 15 mm ≤ X <20 mm | 5% to 10%, |
| 20 mm ≤ X <25 mm | 2% to 6%, |
| 25 mm ≤ X <30 mm | 1% to 4%, |
| 30 mm ≤ X | 0% to 2%; | and
    density of the fragments is 0.03 g/cm$^3$ to 0.06 g/cm$^3$.

2. A bedding product that comprises:
    the paper bedding according to claim 1, and
    a package that packages the paper bedding, wherein
    the bedding product is characterized in that there is a description on the package to the effect that it is suitable for use with an animal pet that has a penchant for hole-digging behavior.

* * * * *